W. J. LEWIS.
BOLT MAKING MACHINE.
No. 3,251. Reissued Jan. 5, 1869.
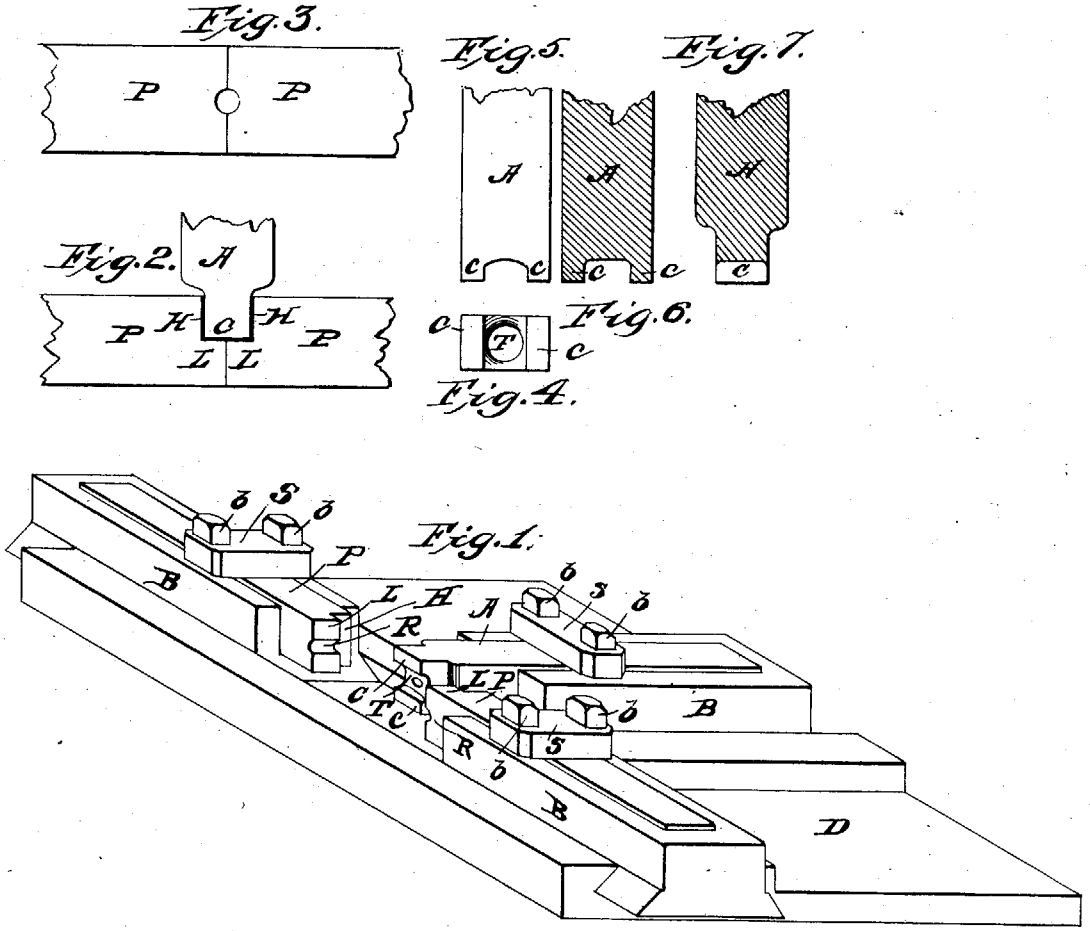
Witnesses
Josiah W. Ellis.
R. H. Lamerson
Inventor
Wm. J. Lewis
E. Gudeman Atty United States Patent Office.

WILLIAM J. LEWIS, OF PITTSBURG, PENNSYLVANIA.

*Letters Patent No.* 41,929, *dated March* 15, 1864; *reissue No.* 3,251, *dated January* 5, 1869.

IMPROVEMENT IN BOLT-MAKING MACHINES.

The Schedule referred to in these Letters Patent and making part of the same.

*To all whom it may concern:*

Be it known that I, WILLIAM J. LEWIS, of Pittsburg, in the county of Allegheny, and State of Pennsylvania, have invented a new and useful Improvement in Dies for Heading Bolts; and I do hereby declare that the following is a full, clear, and exact description thereof, reference being had to the accompanying drawings, forming part of this specification, and to the letters of reference marked thereon.

My invention consists in constructing the dies of a bolt-machine so that they will by their first action force out, at points beyond the line of finish, part of the iron which forms the head of the bolt, and in their subsequent action, on the turning the partly-formed bolt one-fourth way round, will grasp and compress the iron forced out by their first action so as to form a square head on the bolt, free from any "flash or fin;" the said dies being constructed, arranged, and operating in the manner substantially as hereinafter described.

In the accompanying drawings—

Figure 1 is a perspective view of my improvement in dies for bolt-machines.

Figure 2 represents a top view of the working-ends of the dies closed up as when in the act of forming the head.

Figure 3 is a front view of the griping-dies in position, as when holding the bolt.

Figure 4 represents an end view or face of a header provided with cheeks.

Figure 5 is a side view of the same.

Figure 6 is a longitudinal vertical section.

Figure 7 is a horizontal section of fig. 4.

All the drawings are lettered, and similar letters denote corresponding parts in the several views.

To enable others skilled in the art to understand and make my improvement, I will proceed to more particularly describe its construction and operation.

I construct the parts for operating the dies of my machine in any of the well-known ways, but in this case, for the purpose of making the dies work smoothly and evenly, I have formed a tablet, D, in which the boxes B B B slide in dovetailed grooves made therein for that purpose.

These boxes are open at the top and front end. The dies being placed in, are secured by clamps S S S, held down by screws *b b b b b b*.

On the converging or front ends L L of the griping-dies P P is cut a semicircular groove, R, for the purpose of catching the rod of iron from which the bolt is formed.

Just back of this, and in each of the griping-dies, I have made a recess, H, half the width and somewhat more than the full depth of the head of the bolt.

Directly behind the dies, and working at right angles thereto, is the heading-die A, secured and working in the same manner, and with a motion similar to the other dies.

The face T of this die or header is just sufficient to fill the space or recess formed in the griping-dies, as seen at fig. 2.

From the face T of the header A may project cheeks C C, leaving the space between them the exact size of the desired head of the bolt, as indicated in figs. 5, 6, and 7; or the header A may be formed without the cheeks C C, which will cause the dies by their first action to force out, on two sides, a portion of the iron beyond the line of finish of the head of the bolt, and by a subsequent action of the dies, and by turning the bolt one-fourth way round, the dies will work in that portion of the iron which was forced out, thereby forming a square head on the bolt, free from any "flash or fin."

The operation of the dies is as follows:

The iron from which it is intended to form the bolt, being of the size required to make the shank, is inserted between the griping-dies P P, where it is held on their approach in the groove R. Sufficient amount, however, of the rod of iron to form the head is allowed to extend through towards the header, when it, by its motion in the direction of the griping-dies, staves the projecting iron between itself and the dies, holding it until the iron is made to fill the recess left for the formation of the head of the bolt. A portion of the surplus metal, however, is forced out between the dies when open to make another stroke. The partly-formed bolt is turned one-fourth way round by the operator, so as to bring the "fin" produced by the first stroke of the machine directly opposite the solid portion of the dies, whereby the surplus metal is driven into the body of the iron, making a perfectly smooth and well-shaped head without further labor.

I am aware that heading-machines, having griping-dies with a recess or cavity cut therein as a mould or matrix for the head have been in use, but in these machines the walls of the said dies surrounded or embraced the head on all sides, so that the header not only forced the surplus metal between the joints of the griping-dies, but formed a "flash or fin," like a thin flange, around the top of the bolt-head. This occurs when the header does not enter the cavity in the griping-dies, as is the case in most of the machines in use. I am also aware that other machines have been used wherein the header is made to enter the cavity in the griping-dies. In this case the "fin" or surplus metal is drawn out around the sides of the header, leaving the top of the bolt-head cup-shaped. In either of these machines, notwithstanding the bolt may be turned during the operation of heading, their construction is such that the "fin" produced by the first stroke of the machine will remain unaltered.

I am also aware that the burr or fin on the under side of the head and the neck of bolts have been "worked in" by turning the bolt one-fourth way round in the dies.

Therefore I wish it distinctly understood that I do not claim either of these devices, as they are old and well known.

Having thus described the nature, construction, and operation of my improvement,

What I claim as of my invention, is—

The combination of the dies P P and header A, constructed and arranged in relation to each other, substantially as described.

WM. J. LEWIS.

Witnesses:

JAMES J. JOHNSTON,
ALEXANDER HAYS.